United States Patent

[11] 3,615,977

| [72] | Inventors | Gunther Lehnert<br>Hannover-Bothfeld;<br>Gerhard Karl Ziemekm, Hannover; Fritz<br>Otto Glander, Isernhagen; Bern Otto<br>Eilhardt, Vinnhorst, all of Germany |
|---|---|---|
| [21] | Appl. No. | 846,858 |
| [22] | Filed | Aug. 1, 1969 |
| [45] | Patented | Oct. 26, 1971 |
| [73] | Assignee | Kabel-und Metallwerke Gutehoffnung-<br>shutte Aktiengesellschaft<br>Hannover, Germany |
| [32] | Priority | Aug. 8, 1968 |
| [33] | | Germany |
| [31] | | P 17 79 406.8 |

[54] METHOD OF INSULATING COAXIAL TUBING SYSTEMS
9 Claims, 4 Drawing Figs.

[52] U.S. Cl.................................................. 156/79, 156/54

[51] Int. Cl.................................................. B32b 5/20
[50] Field of Search.......................................... 156/79, 54; 138/121, 122, 173

[56]  References Cited
UNITED STATES PATENTS

| 2,817,363 | 12/1957 | Penrose.................... | 138/122 |
| 3,144,369 | 8/1964 | Foord et al. ................ | 156/79 X |
| 3,325,573 | 6/1967 | Boon et al.................. | 156/79 X |
| 3,332,814 | 7/1967 | Yoshimura et al............ | 156/79 X |
| 3,344,228 | 8/1967 | Woodland et al............ | 156/79 X |

Primary Examiner—Benjamin A. Borchelt
Assistant Examiner—G. E. Montone
Attorney—Philip G. Hilbert ABSTRACT: A method of insulating coaxial tubing systems for conveying heated or cooled gaseous or liquid materials by forming in situ a foamed insulating body disposed between the coaxial tubing members as they are formed.

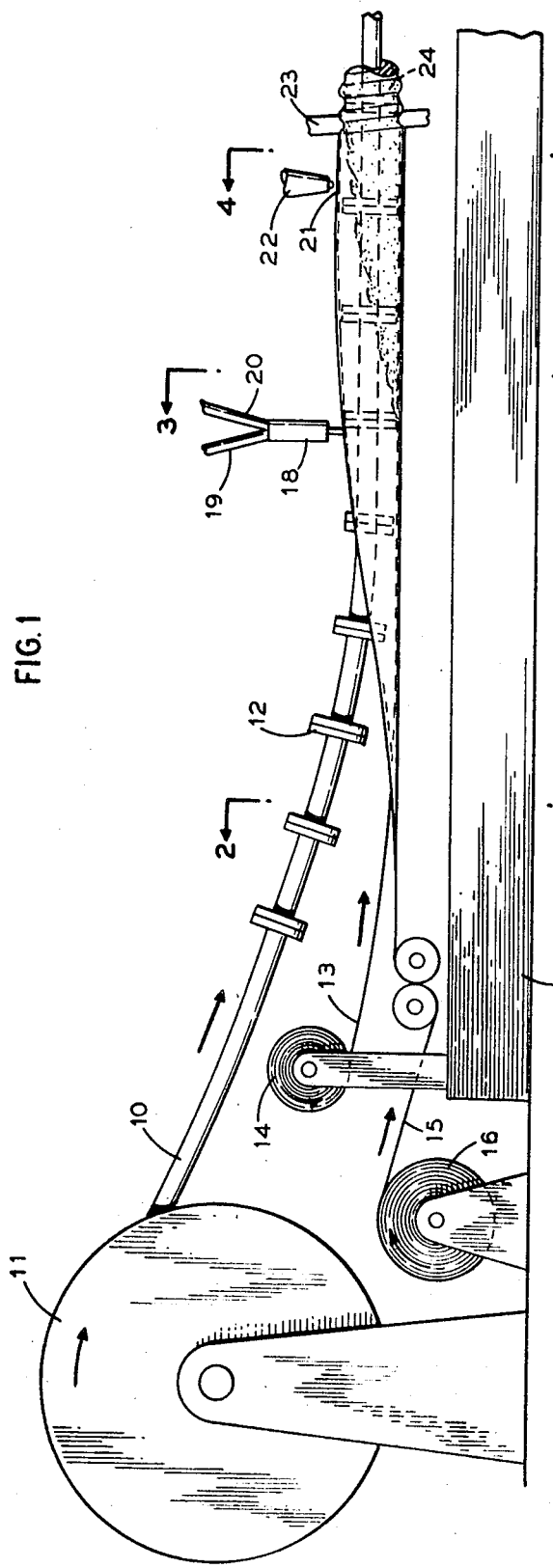
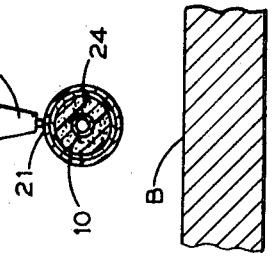
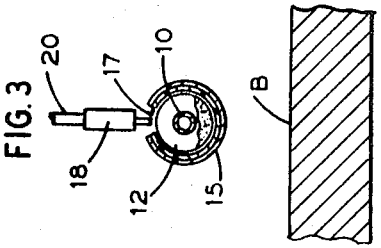
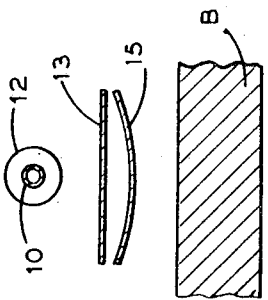

METHOD OF INSULATING COAXIAL TUBING SYSTEMS

BACKGROUND OF THE INVENTION

It has been proposed to insulate pipe lines or the like constituted of two or more coaxially related tubing members with annular spaces therebetween of varying dimensions, by applying to the outer surface of the innermost tubing member preformed foamed plastic material as a helical winding or as a longitudinally extending covering with a longitudinal seam.

However, such known procedures have a number of limitations, particularly when the annular spacing between the tubing members is of a substantial dimension, requiring very thick foamed sheets. Since the applied insulation is heat sealed at appropriate points and edges, the thickness of the insulation presents problems in the heat sealing operation.

Also, when the tubing members are transversely corrugated to provide for flexibility, the interposed foam insulation, in soft forms, may be nonuniformly distributed at the crests of the corrugations, leading to deviations in the concentricity of the coaxial tubing members. If hard foam insulation is used, there are difficulties in shaping the same to the contours of the tubing members. Further, attempts to overcome known disadvantages by utilizing the foam insulation in laminated, thin layers only created further problems in respect to the heat sealing operation and apparatus necessary for applying the same.

Accordingly, an object of this invention is to provide an improved method of insulating coaxial tubing systems by forming foamed insulating materials in situ by mixing the several chemical components thereof and depositing the same in liquid form in the space between coaxial tubing members as the same are being assembled.

Another object of this invention is to provide a method of the character described, as applied to transversely corrugated tubing members, wherein the foam insulating composition in its initial liquid form is deposited on an elongated carrier tape to prevent the same from adhering to the inner surface of the outer tubing member which is thereafter transversely corrugated, to thereby prevent kinking of the inner corrugated tubing member with adverse effects on the flow of media through such inner tubing member.

A further object of this invention is to provide a method of the character described wherein the carrier for the foam insulation is effective to permit relative motion between the inner and outer tubular members; and further, facilitates the subsequent corrugation of the outer tubular member.

Other objects of this invention will in part be obvious and in part hereinafter pointed out.

BRIEF DESCRIPTION OF THE DRAWING

FIG. 1 is a side elevational view illustrating the method of insulating coaxial tubing systems, in accordance with the instant invention;

FIG. 2 is a transverse sectional view taken on the line 2–2 of FIG. 1;

FIG. 3 is a transverse sectional view taken on the line 3–3 of FIG. 1; and

FIG. 4 is a transverse sectional view taken on the line 4–4 of FIG. 1.

DESCRIPTION OF THE PREFERRED EMBODIMENTS

The method of the instant invention comprises a continuous assembly of inner and outer tubings with an annular space therebetween; a carrier tape being fed into said space for longitudinal movement with the tubings; the deposition in situ of a liquid foam forming composition on the moving tape, followed by the completion of the forming of the outer tubing as by welding a longitudinal seam and transverse corrugation of the same; the foam composition being converted to foam form at an appropriate point in the operation.

Thus, as shown in FIG. 1, preformed metal tubing 10 is drawn from a supply reel 11 and is suitably transported in a longitudinal path P; spacer members 12 of plastic foam or other suitable insulating material being suitably mounted on tubing 10 at longitudinally spaced intervals. The tubing 10 may be formed of copper or other suitable metal, and may be either smooth walled or transversely corrugated to increase the flexibility thereof.

Concurrently with the movement of tubing 10, a paper tape 13, which is crimped or corrugated is drawn from a supply reel 14 upstanding from one end of a base B, and is folded by suitable means, not shown, into tubular form about tubing 10. Also, a metal tape 15 is drawn from a supply reel 16 in advance of reel 14, for conversion into tubular form, by folding means not shown.

The width of paper tape 13 is such that in its folded tubular form, the opposed longitudinal edges thereof have a spacing of 30 to 40 mm. providing a longitudinal slot 17. A liquid foam forming composition is deposited on said tubular paper tape by way of said slot 17, said composition being formed in a mixing head 18 having supply conduits 19, 20 for the constituents thereof. Thus, with the well known polyurethane foams, polyols and isocyanates are admixed in a known manner to produce the desired foam forming composition.

The foam forming composition may have a pot time of up to 10 minutes, and as the tape 13 carrying the same continues its movement; the composition foams to fill the space between tape 13 in its tubular form 13A and tubing 10. The metal tape 15 is being folded into tubular form concentric with tubing 10, to provide the outer tubular member 21 whose longitudinally extending edges are seamed together by suitable seam welding apparatus 22 located beyond mixing head 18.

Thereafter, the outer tubular member 21 may be transversely corrugated by known corrugating means generally indicated at 23. The tape 15 may be of steel or other suitable metal or alloy. The foaming action of the composition deposited on carrier tape 13 may be completed at corrugating station 23 to form the in situ formed insulation 24.

It will be apparent that with the corrugation of metal tape 15, at station 23; it will be necessary to feed tape 15 at speeds somewhat greater than that of tape 13 and tubing 10; while beyond station 23 the assembly of elements moves at a uniform speed.

The nature of the carrier tape which transports the liquid foam forming composition may be varied in accordance with the characteristics of the composition. Thus, when such composition has a pot time of up to 50 seconds, causing complete foaming in advance of corrugating station 23; a form stable tape is used which may take the form of a steel tape having a thickness ranging from 0.02 and 0.7 mm. and preferably from 0.05 to 0.4 mm. Such tapes assure concentricity of the coaxially related tubular members.

Further, with a slow foaming composition deposited between tapes 13 and 15, a lubricating action is obtained up to the corrugating station with foaming taking place thereafter. With the slow foaming compositions having a pot time up to 10 minutes, the carrier tape 13 needs no rigidity and merely transports the composition which may foam beyond the corrugating station 23 and thus may be of paper or the like. With a crimped paper tape, the same readily embeds itself into the corrugations of outer tubular member 21 when the foaming action takes place.

With the longitudinal slot 17 provided in tape 13, foamed resin material may be deposited on the inner surface of outer tubular member 21 to provide a waterproofing seal therefor. Also, when using slowly foaming compositions, the tapes 13, 15 may be concurrently folded into tubular shape about inner tubular member 10; the composite folded tapes having a longitudinal slot to pass the foaming composition into the annular space between the inner and outer tubular members 10, 21.

The resultant coaxial tubing systems may be used for conveying heated fluids as well as cooled fluids over long distances with minimized thermal losses. Also, such systems may be used in supercooled conditions, in which the same may be used to carry electrical cables under superconductive conditions, using liquified helium. The polyurethane and related synthetic resin foams have excellent insulating properties, insuring low heat losses.

It is understood that the coaxial tubing systems of the instant invention may be further processed to apply corrosion proof outer coatings, as by extruding such coatings over the outer surface of the outer tubular member 21.

We claim:

1. A method of insulating coaxially related, concentric tubular members having an annular space therebetween comprising moving an inner tubular member in a longitudinal path, moving a tape carrier in said path and converting said carrier to tubular form concentrically about said inner tubular member, forming an outer tubular member about said tape carrier, depositing a liquid foam forming composition on said tape carrier and foaming said composition to form an annular foam insulating body between said inner tubular member and said tubular tape carrier and corrugating said outer tabular member.

2. A method as in Claim 1 wherein said outer tubular member comprises a metal tape, folding said metal tape into tubular form with the longitudinal edges thereof adjacent each other, and forming a longitudinal seam between said tape edges.

3. A method as in Claim 2 wherein said carrier tape is metal and said composition is foamed in advance of said corrugating operation.

4. A method as in claim 3 wherein said carrier metal tape has a thickness of from about 0.02 mm. to about 0.7 mm.

5. A method as in claim 1 wherein said carrier tape is paper and said composition is foamed after said corrugating operation.

6. A method as in Claim 5 wherein said paper tape is crimped.

7. A method as in Claim 1 wherein foam forming composition is deposited between said tape carrier and said outer tubular member.

8. A method as in Claim 1 wherein the longitudinal edges of said tape carrier are spaced to form a longitudinal slot for allowing foam forming composition to pass between said tape carrier and said outer tubular member.

9. A method as in Claim 1 wherein said composition is a polyurethane.

* * * * *